May 12, 1931. R. E. MANLEY 1,804,997
DOLLY
Filed Oct. 15, 1926
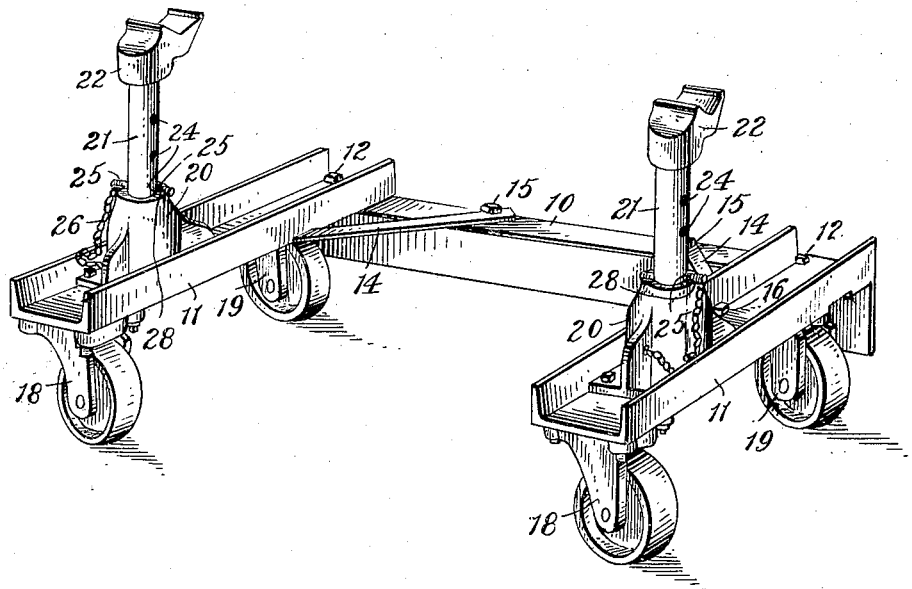
Witness
Jas E Hutchinson
Inventor:
Robert E. Manley,
By H H Snelling
Attorney:

Patented May 12, 1931

1,804,997

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

DOLLY

Application filed October 15, 1926. Serial No. 141,846.

This invention relates to dollies and has for its object the provision of a simple and efficient dolly for shifting the position of an automobile. Under many circumstances it is desirable to move an automobile a slight amount in such a direction as to make it very awkward and inconvenient to use a jack, particularly in case an automobile is to be moved a slight distance sideways. This lateral movement can not be taken care of by a jack without pulling the automobile forward in the direction of its travel and then jockeying around so as to make it possible to back into the desired space, this taking a considerable amount of space which is not always available, as for example, in a parking garage.

The figure is a perspective view of one form of the invention which has been found very satisfactory in practice.

The transverse beam 10 is shown as an angle bar and the two longitudinal but shorter beams 11 are here shown as channels, these being the preferred form but obviously any other rolled or other type of beam will be satisfactory. The longitudinal beams are bolted to the transverse beam 10 as at 12 but I prefer to add a pair of diagonal straps 14 which are bolted to the transverse beam as at 15 and to each longitudinal beam or channel 11 as at 16. At the free end of each channel member 11 I secure a caster 18 and near the junction with the transverse beam 10 a second caster 19 is secured, these casters being of well known swivel type quite common in this class of work.

Between the two casters of each beam 11 I secure a socket 20 which receives a stem or standard 21 having at its top a bracket 22 preferably permanently secured thereto. The standard 21 is perforated by a number of diametric holes 24 adapted to receive a pin 25 preferably secured to the socket as by the chain 26. I find it convenient to groove the top face of the socket as at 28 to receive the pin 25, thus preserving the parallelism of the two brackets 22.

The operation of the device is as follows:—
The dolly is pushed under a car with the transverse angle iron beam 10 parallel with the axle but with the brackets 22 slightly in front of the axle and elevated to the desired height. An ordinary jack is now brought into the free space between the two parallel projecting beams 11 with the jack saddle in position to engage the axle. The axle is lifted by the jack and then the dolly is moved the few inches necessary to bring the brackets beneath the axle to receive it when the car is lowered. Since the casters 18 and 19 of the dolly pivot freely, the car may readily be moved sideways, withdrawing the jack if necessary. If it is desired to store the car in the new position, the car is raised by the jack and the dolly pulled to free the axle on the downward movement of the axle when the car is brought to rest on its own tires. If however, as is frequently the case, the car is to be repaired it is simply shoved about, resting on the dolly which under such circumstances acts very much as an ambulance minus the usual tongue.

What I claim is:—

1. In a dolly, a plurality of parallel beams, a pair of wheels for each of the parallel beams, and a supporting member on each of the parallel beams between the wheels, and a single transverse bar connecting the rear ends of the two beams so as to leave the space between the beams free and unrestricted so that a wheeled jack bearing an automobile may be moved in between the parallel bars and while so positioned be lowered to transfer the automobile from the jack to the supporting members.

2. In an automobile dolly, a pair of rolled steel beams, a caster at each end of each beam, a casting secured to each beam between the casters, a supporting device adjustable in each casting, and a transverse bar secured to each beam to one side of both casters of each beam, whereby the space between the beams is entirely free at the front end so as to receive an automobile jack.

3. In an automobile dolly, a U-shaped frame, a caster at the free end of each leg of the U frame, additional caster means for supporting the dolly, a standard rising from each leg of the U frame near the caster at the free end, and a supporting means extending from the standard away from the free end of the leg of the U.

In testimony whereof I affix my signature.

ROBERT E. MANLEY.